June 7, 1932.                J. F. PETERS                1,862,316
                          PIPE WELDING SYSTEM
                          Filed April 17, 1931

WITNESSES:                                      INVENTOR
                                              John F. Peters
                                                   BY
                                                        ATTORNEY Patented June 7, 1932

1,862,316

UNITED STATES PATENT OFFICE

JOHN F. PETERS, OF EDGEWOOD, PENNSYLVANIA, ASSIGNOR TO WESTINGHOUSE ELECTRIC & MANUFACTURING COMPANY, A CORPORATION OF PENNSYLVANIA

PIPE-WELDING SYSTEM

Application filed April 17, 1931. Serial No. 530,770.

My invention relates to power systems and particularly to automatically controlled energizing systems for inductive pipe-welding machines.

It is an object of my invention to provide an automatic energy-control system utilized with an inductive pipe-welding machine to maintain the energy input into the system substantially constant throughout the cycle of operation of such machine.

Another object of my invention is to provide an energy-control system that shall be effective to insure the proper welding of substantially the entire length of a pipe blank being moved through the welding machine.

Another object of my invention is to provide a control system that shall be governed by a moving piece of work material to maintain the energy input into such piece of material substantially constant.

Another object of my invention is to provide a system controlled by the reactive effect of a main energizing coil for maintaining the energy input to an energy-translating system substantially constant.

In practicing my invention, I provide a main and an auxiliary energy coil located on opposite sides of a pipe blank being moved through a welding machine and control the energy input into the secondary energizing coil by a wattmeter instrument connected in the energizing circuit common to both energizing coils.

Figure 1:
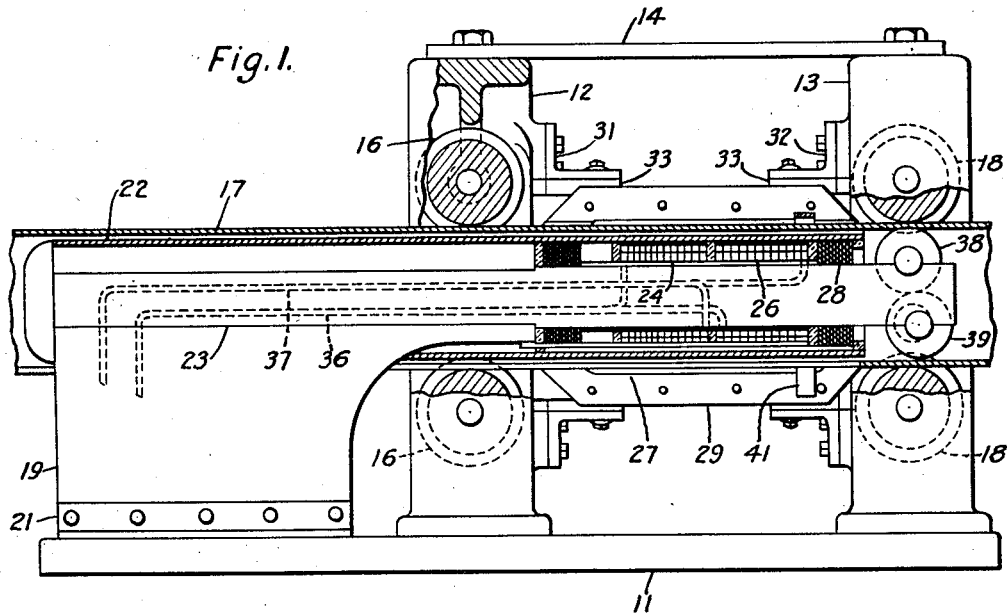
Figure 2:
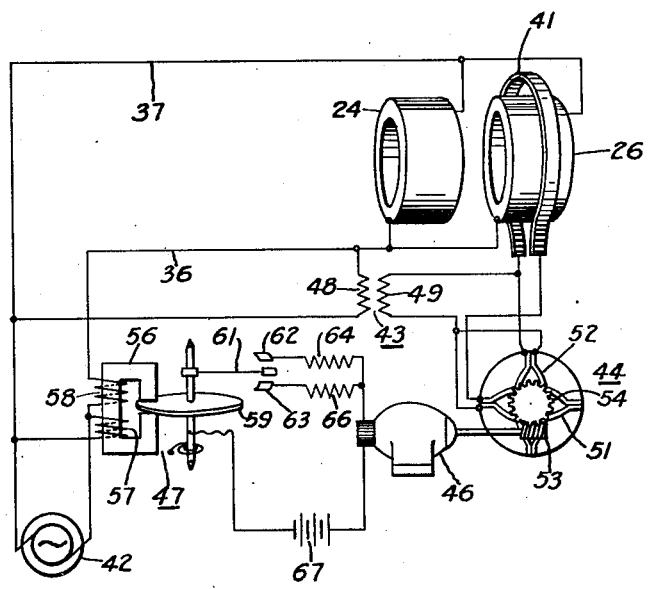

In the single set of drawing,

Figure 1 is a view, in vertical longitudinal section, through a pipe-welding machine with which the control system embodying my invention is used, and, Fig. 2 is a diagram of connections illustrating the system embodying my invention.

Referring first to Fig. 1 of the drawing, I have there illustrated a pipe-welding machine which may be mounted on a suitable metal base plate 11 and which includes a leading standard 12 and a trailing standard 13 spaced apart a suitable distance and having their respective lower ends secured to the base 11 in any suitable or desired manner, not shown in the drawing. The upper ends of the standards may be maintained in proper spaced relation by a cross bar 14 bolted thereto.

The standards 12 and 13 are of skeleton-shape and support a plurality of rolls which, in the case of the leading standard 12, are preferably guide rolls 16 uniformly spaced peripherally around an initially open pipe blank 17 which is to be moved therebetween and to have its abutting edges heated and welded. The trailing standard 13 has a plurality of uniformly peripherally spaced pinch rolls 18 located therein and it is to be noted that the shape of the external surface of each of the rolls 16 and 18 is such as to fit around a portion of the periphery of the pipe blank to properly support, locate and move or pinch the same together.

A support for the pipe blank and for the main energizing coil includes a vertically extending web 19 the bottom edge of which may be provided with angle-bar members 21 at each side thereof which may, in turn, be suitably bolted to the top of the bed plate 11. The web member 19 has a tubular member 22 mounted thereon within which is located and supported, in any suitable or desired manner, a coil-and-core-supporting member 23 which may be of substantially elongated box-shape.

The supporting frame 23 has two parallel-connected coil sections 24 and 26 insulatedly mounted thereon, each including a plurality of turns of a suitable current conductor which may be substantially rectangular in shape, as shown in Fig. 1 of the drawing or, if desired, may be of any other proper or suitable shape in lateral section. While no details of insulation between the coil sections and the support 23 are shown and while no insulation is shown specifically between the turns and layers of the coil sections, it is to be understood that such insulation is provided, in a manner well known in the art.

A core member 27 is located at the leading end of coil section 24 and a second core member 28 is located at the trailing end of coil section 26 and these internal core members cooperate with an external core member 29 which is of substantially flattened U-shape and which includes a plurality of sets of sheet-steel laminations. A plurality of such sets 29 are spaced peripherally around the pipe blank and any desired number of such sets may be utilized. Supporting means for the sets of laminations 29 may include a plurality of brackets 31 and 32, each of substantially L-shape, bolted against the inner faces of standards 12 and 13, insulating material 33 being located between the metal brackets 31 and 32 and the core laminations.

The two coil sections 24 and 26 are provided with suitable terminals, the ends of which may be connected together and to suitable terminal leads 36 and 37, which extend initially through the box-like support 23 and then downwardly and outwardly therefrom closely adjacent to the web 19, so that connections may be made to the conductors of a suitable supply circuit.

It was hereinbefore stated that the rolls 18 are pinch rolls which serve to force the heated edges of the pipe blank together in order that a suitable weld may be effected therebetween, the operation of the system being substantially as follows:

The energizing coil, including the sections 24 and 26, will cause a secondary current to flow peripherally of the pipe blank which is initially open, and the cleft thereof is located at the bottom, it being understood that the edges of the same are pressed into engagement by the pinch rolls to permit of the current flowing peripherally around the pipe. In order to assist the pinch rolls 18, I provide a pair of reaction rollers 38 and 39 rotatably mounted in, and supported by, the box-like member 23, the reaction rolls 38 and 39 cooperating with the pinch rolls 18 to assist in forming a suitable weld.

If the pipe blank 17 has moved so far to the right that coil section 24 is uncovered, it will be apparent that it will operate as a reactance and that only coil section 26 will be fully effective to operate as the primary of a transformer structure of which the pipe blank is the single-turn secondary. This means that a smaller amount of electric energy is being translated into heat in the pipe blank so that, if no auxiliary means is provided, there will be a tendency for the trailing end of the pipe blank to leave the machine without being properly welded, thus making necessary a cropping thereof.

In order to overcome this, I provide an auxiliary single-open-turn energizing coil 41, which is located on the outside of the pipe blank and is suitably supported by a means not shown in the drawing.

Fig. 2 shows the diagram of connections, of the main and of the auxiliary coil to a source 42 of electrical energy which is illustrated as an alternating-current generator. While the coil sections 24 and 26 are connected in parallel with each other and to the source 42, the auxiliary coil 41 is energized through a transformer 43 and an induction regulator 44, which latter is controlled directly by a motor 46 and a wattmeter instrument 47. The transformer 43 includes a primary winding 48 connected across the conductors 36 and 37 and a secondary coil 49, one terminal of which is connected directly to one terminal of coil 41 and the other terminal of which is connected to one terminal of a stationary series coil 51 of regulator 44, the other terminal of series coil 51 being connected to the other terminal of coil 41. A movable shunt coil 52 of the induction regulator is connected in parallel with the terminals of the secondary coil 49 of transformer 43.

Motor 46 is shown generally only as being operatively connected, through a worm 53 and a worm wheel 54, to effect a turning movement of the coil 52 relatively to coil 51, in a manner well known in the art, to thereby vary the voltage supplied to coil 41 from secondary coil 49.

The wattmeter instrument 47 is illustrated generally only as including a suitable magnetizing core member 56, a shunt coil 57 and a series coil 58 thereon and a disk armature 59 controlled by the flux generated in the core 56 by the coils 57 and 58. A movable contact arm 61 is actuated by the turning shaft of disk 59 to selectively engage the one or the other of fixed contact members 62 and 63 which are, respectively, connected to terminals of field coils 64 and 66 of the motor 46. A source of electric energy 67 is shown as connected to the moving portion of the wattmeter instrument 47 and to motor 46 in such manner that the motor armature will be caused to turn in one direction if contact arm 61 engages contact member 62 and to turn in the opposite direction if arm 61 engages contact member 63.

As long as the pipe blank covers the entire axial length of coil sections 24 and 26, they will operate as fully energized primary coils of a transformer structure of which the pipe blank constitutes the closed single-turn secondary winding. A certain but relatively small amount of flux generated by the main coil will be effective to cause a current to traverse the auxiliary coil 41 which, in turn, will constitute the primary of the transformer structure the secondary of which is the pipe blank. The adjustment of the system is such that, under these conditions, the energy input into coil 41 from the source 42 is relatively small.

If, however, part of the main energizing coil is uncovered, as, for instance, if the trailing end of the pipe blank 17 has moved so far to the right that the end is well beyond the leading end of section 26, coil section 24 and the uncovered portion of section 26 will act as reactors, and the immediate result of this will be to decrease the energy input into the energizing coil system.

The wattmeter instrument 47 is so adjusted that, as soon as the energy input is reduced, the contact arm 61 is moved, say in a counter-clockwise direction, so that it engages contact member 62 to thereby energize field winding 64 and the armature to cause turning movement of the armature to effect a turning movement of coil 52 in such direction as to increase the voltage supplied to or provided at the terminals of coil 41, so that the energy input into this auxiliary coil is increased. This action of the wattmeter instrument, the motor and the induction regulator will continue until substantially the same amount of electric energy is utilized in the main and auxiliary coil as was used initially. It is obvious further that, as the trailing end of the pipe blank continues to move to the right, a larger portion of coil section 26 will be uncovered and this coil section will operate more and more as a reactor. In this case, the action of the wattmeter instrument, the control motor and the induction regulator will continue until, at the instant when substantially all of the coil section 26 has been uncovered, all of the energy transformed into heat in the pipe blank will be provided by the auxiliary coil 41. However, as the time during which this maximum amount of energy is supplied to, and translated in, coil 41 is a very short period of time, it is apparent that this coil may be made relatively small, as is shown generally in the drawing, without causing damage thereto by over-heating.

If such auxiliary coil were not provided, the main energizing coils would tend to operate as reactors during the last few instants of the cycle of operation so that, as has hereinbefore been stated, the trailing end of a pipe blank might be imperfectly welded, but by the use of the auxiliary energizing coil, as hereinbefore described, in combination with a control system actuated primarily by the moving pipe blank itself, in the manner hereinbefore described, and a constant-energy-input control means, insures that substantially the entire length of a pipe blank will be properly welded, particularly at the trailing end thereof.

Various modifications may be made in the system embodying my invention without departing from the spirit and scope thereof and I desire, therefore, that only such limitations shall be placed on my invention as are imposed by the prior art or are set forth in the appended claims.

I claim as my invention:

1. In an inductive heating system, including a main energizing coil and an auxiliary energizing coil for inductively heating a moving piece of material, means controlled by the moving piece of material for maintaining the energy input into the system substantially constant.

2. In an inductive heating system, including a main energizing coil and an auxiliary energizing coil for inductively heating a moving piece of material, means controlled by the reactive effect of the main energizing coil for maintaining the energy input into the system substantially constant.

3. In a pipe-welding machine, including a main and an auxiliary energizing coil for inductively heating a moving pipe blank, and an energizing curcuit therefor, means, including a wattmeter instrument, in the energizing circuit of the two coils for increasing the energy input into the auxiliary coil as the energy input into the main energy coil decreases in accordance with the movement of the pipe blank relatively to the main energizing coil.

4. In a pipe-welding machine, including a main and an auxiliary energizing coil for inductively heating a pipe blank moving along the coils and an energizing circuit therefor, means, including a wattmeter instrument, in the energizing circuit of the two coils for causing an increase in the energy input into the auxiliary coil as the energy input into the main coil decreases by reason of the movement of the pipe blank relatively to the main energizing coil.

5. In a pipe-welding system, including an energizing circuit, a main and an auxiliary energizing coil for inductively heating a moving pipe blank and an induction regulator connected between the auxiliary energizing coil and the energizing circuit, means, including a wattmeter instrument, in the energizing circuit for effecting control of the induction regulator to increase the voltage applied to the auxiliary coil when the energy input into the main energizing coil decreases by reason of the movement of the pipe blank relatively to the main energizing coil.

6. In a pipe-welding system for inductively heating a moving pipe blank and including an energizing circuit, a main energizing coil having a large axial length and an auxiliary energizing coil having a relatively short axial length and located adjacent to the trailing end of the main energizing coil, means, including a wattmeter instrument, in the energizing circuit for causing the energy input into the auxiliary coil to be substantially zero as long as the main energizing coil is located between the ends of the moving pipe blank and for increasing the energy input into the auxiliary coil as the trailing end of the moving pipe blank approaches the trailing end of the main energizing coil.

7. In a pipe-welding system, including a main and an auxiliary energizing coil for inductively heating a moving pipe blank and an energizing circuit for the coils, means, including an electric energy-measuring device, in the electric circuit for effecting an increase in the energy input into the auxiliary coil when the reactive effect of the main energizing coil increases by reason of a looser inductive coupling with the moving pipe blank.

8. In a pipe-welding system, including a main and an auxiliary energizing coil for inductively heating a moving pipe blank and an energizing circuit for the coils, electric means controlled in accordance with the degree of inductive coupling of the main energizing coil with the moving pipe blank for increasing the energy input into the auxiliary coil.

In testimony whereof, I have hereunto subscribed my name this 9th day of April, 1931.

JOHN F. PETERS.